July 5, 1949.    F. H. ELAND    2,475,018
DISCHARGE VALVE FOR SCREW CONVEYERS
Filed Oct. 28, 1946
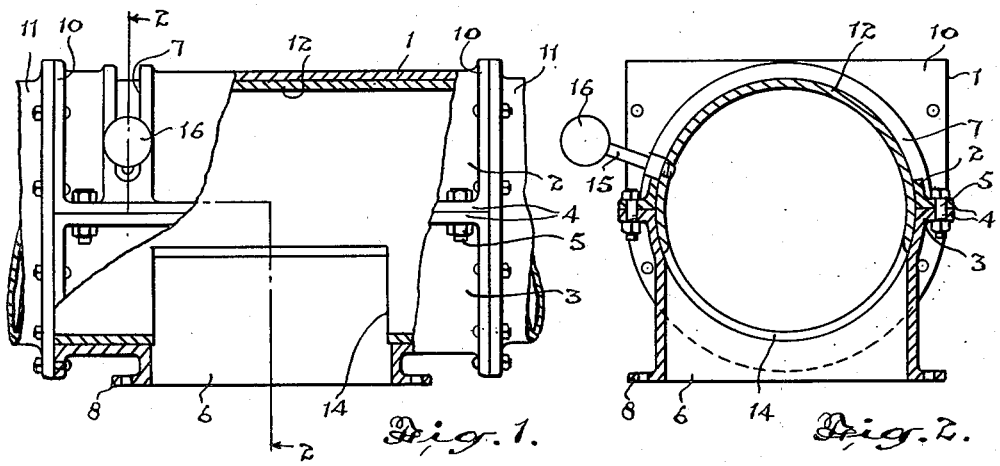
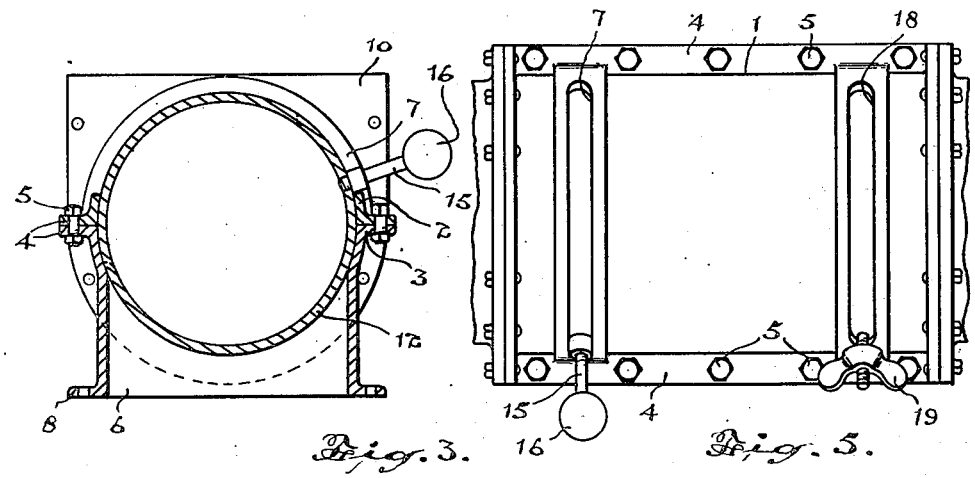
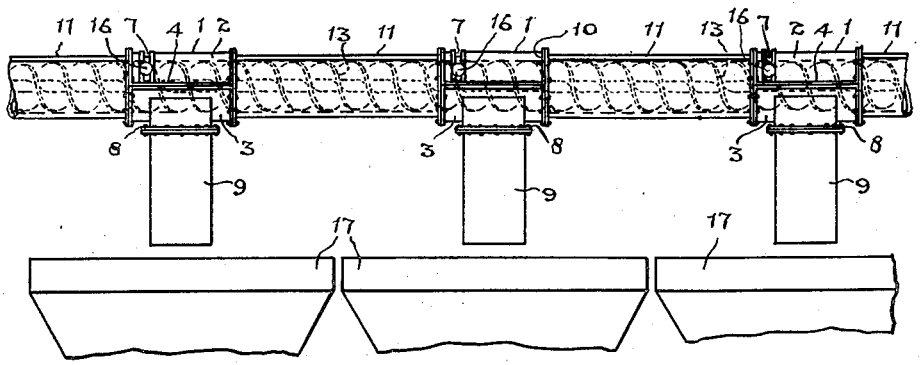
Inventor.
F. H. Eland
by H. S. Dunnison
Atty.

Patented July 5, 1949

2,475,018

UNITED STATES PATENT OFFICE 2,475,018

DISCHARGE VALVE FOR SCREW CONVEYERS

Frank H. Eland, Toronto, Ontario, Canada, assignor to United Steel Corporation Limited, Toronto, Ontario, Canada Application October 28, 1946, Serial No. 706,163

3 Claims. (Cl. 251—9)

This invention relates to discharge valves, and in particular to discharge valves for use with screw conveyors such as are used to move grain or like material in feed mills and the principal object of the invention is to provide a screw conveyor with a simple dust-tight self-cleaning valve which will ensure a clean discharge and preclude any possibility of the material carried by the conveyor from becoming lodged in the conveyor conduit adjacent the valve to form a breeding spot for vermin.

A further important object is to provide a simple valve which can be quickly assembled and placed in any desired part of the conveyor conduit at a very low cost, and which can be readily controlled from without the conduit.

A still further object is to provide a valve which will permit the accurate regulation of discharge flow from any of its laterals.

The principal feature of the invention consists in providing a casing which is formed with an open throat and which can be readily assembled and secured in place to form a part of a screw conveyor conduit, and arranging within said casing a snugly fitting rotatable sleeve formed with a port adapted to be moved into and out of register with the open throat of the encompassing casing.

A further important feature is the provision of means by which the movement of the rotatable sleeve may be easily and accurately effected from without the casing.

In the accompanying drawings,

Figure 1 is a side elevational part sectional view of a screw conveyor valve structure constructed in accordance with my invention.

Figure 2 is a sectional view taken on the line 2—2 of Figure 1 and showing the valve in the fully open position.

Figure 3 is a view similar to Figure 2 but showing the valve in the closed position.

Figure 4 is a reduced side elevational view showing my valve structure applied to a screw conveyor system.

Figure 5 is a plan detail of a modified form of the invention.

Referring to the accompanying drawings, it will be seen that my valve structure comprises a casing generally indicated as 1 which is preferably cast in two half sections 2 and 3, the edges of which are turned outwardly to form the flanges 4. The sections 2 and 3 are placed so that their flanges 4 abut and bolts 5 through the abutting flanges hold them securely together.

The casing 1 is generally cylindrical in shape but is formed with a substantially square throat or opening 6 in the underside thereof and with a part circumferential slot 7 extending around the upper side adjacent one end. The lower edges of the throat 6 are turned outwardly to form flanges 8 to which a discharge tube or chute 9 may be bolted.

The ends of the casing 1 are also provided with flanges 10 so that it may be conveniently bolted to adjacent sections of the conveyor conduit 11.

Snugly fitting within the casing 1 is a rotatable cylindrical sleeve 12, the inner diameter of which corresponds to the inner diameter of the adjacent lengths of conduit through which the spiral or screw 13 of the conveyor operates with its flange engaging the walls thereof. This sleeve is of course arranged in position before the two half sections 2 and 3 of the casing are bolted together.

A portion of the sleeve 12 is cut away to form an opening 14 which is adapted to register with the opening 6 in the casing, the projected areas of the two openings being equal.

Rigidly secured to the periphery of the sleeve 2 is a radially extending arm 15 which projects through the slot 7 in the casing, and the outward end of this arm carries a gripping knob or handle 16. Any movement of the arm in the slot will of course effect rotation of the sleeve.

When the arm 15 is moved to one extreme end of the slot 7 to the position shown in Figure 2 it will be seen that the sleeve will be rotated until the opening 14 therein registers exactly with the throat 6 and the valve will be fully open. If, on the other hand, the arm 15 is moved to the other extreme end of the slot to the position of Figure 3, the valve will be fully shut for the opening 14 will be closed by the solid wall of the casing. Intermediate positions of the arm 15 will give partial valve openings and of course the amount of material discharged from the conveyor to the bins 17 will depend on the valve setting.

It will be readily understood that the very nature of the sleeve walls which are smooth and have no abrupt changes in curvature, together with the wiping action of the screw as it operates through the sleeve will preclude any possibility of material becoming lodged in the valve structure to become the breeding ground of vermin, and further, the snug sliding fit of the sleeve within its casing will prevent the undesirable entry or dissipation of dust or dirt.

It will also be appreciated that the simplicity of the valve and the ease with which it may be assembled and placed in any desired part of a screw conveyor conduit render it an exceedingly important structure.

It is desirable that means be provided for locking the valve in any desired position and to accomplish this a lock nut may be arranged on the handle 15.

It may also be desired to provide a slot 18 near the opposite end of the valve casing and provide the valve with a stud and lock nut 19. This arrangement permits the valves having the operating handles staggered where conduits are arranged too close together to permit handles in both conduits being operated in the same transverse plane.

What I claim as my invention is:

1. A discharge valve for screw conveyors comprising a substantially cylindrical open-ended casing formed with an open throat and adapted to be placed in any part of a screw conveyor conduit to form a part thereof, a rotatable sleeve fitting snugly within said casing, said sleeve being provided with a port and having an inner diameter equal to the inner diameter of said conduit, a part-circumferential slot formed in said casing adjacent each end, a handle extending through one of said slots for rotating said sleeve, a member extending through the other of said slots, and locking means carried by said latter member.

2. A device as claimed in claim 1 in which said latter member is threaded and said locking means comprises a locking nut threaded on said threaded member and adapted to engage said casing.

3. A discharge valve for screw conveyors comprising a substantially cylindrical casing adapted to form a part of a screw conveyor conduit, said casing being formed with a part-circumferential slot and a discharge throat, a rotatable sleeve arranged within said casing, said sleeve being formed with a port and having an inner diameter equal to the inner diameter of said conduit, means secured to said sleeve and extending through said part-circumferential casing slot for rotating said sleeve to move said sleeve port into and out of register with the throat in said casing, and a lock means carried by said rotatable sleeve and adapted to engage in locking contact with said casing to lock said sleeve against rotation in adjusted positions.

FRANK H. ELAND.

REFERENCES CITED

The following references are of record in the file of this patent:

UNITED STATES PATENTS

| Number | Name | Date |
| --- | --- | --- |
| 200,383 | Fischer | Feb. 19, 1878 |
| 1,037,378 | Ward | Sept. 3, 1912 |
| 1,272,998 | Rasmussen | July 16, 1918 |
| 1,401,097 | Nickolaus | Dec. 20, 1921 |
| 1,412,285 | James | Apr. 11, 1922 |
| 2,311,797 | Wright | Feb. 23, 1943 |

FOREIGN PATENTS

| Number | Country | Date |
| --- | --- | --- |
| 732,612 | France | June 20, 1932 |